United States Patent [19]

Revis

[11] Patent Number: 5,502,105
[45] Date of Patent: Mar. 26, 1996

[54] METHOD OF EMULSION POLYMERIZATION

[75] Inventor: Anthony Revis, Freeland, Mich.

[73] Assignee: Dow Corning Corporation, Midland, Mich.

[21] Appl. No.: 296,200

[22] Filed: Aug. 25, 1994

[51] Int. Cl.⁶ ..................................................... C08L 83/00
[52] U.S. Cl. ........................... 524/837; 424/401; 424/70.1
[58] Field of Search ............................. 524/837; 424/401, 424/70.1

[56] References Cited

U.S. PATENT DOCUMENTS 2,891,920  6/1959  Hyde et al. ............................. 260/29.2

*Primary Examiner*—Melvyn I. Marquis
*Assistant Examiner*—Karen A. Dean
*Attorney, Agent, or Firm*—James L. DeCesare

[57] ABSTRACT

An emulsion is made by dispersing a siloxane in water by forming a mixture of water, a cyclic siloxane, and an ethoxylated alcohol nonionic surfactant. An organosilanolate initiator is used, and the mixture is free of other surfactants which bear a charge. The cyclic siloxane is polymerized until an emulsion is formed, and the emulsion is free of electrical charge. The emulsion is more compatible in the personal care arena.

20 Claims, No Drawings

METHOD OF EMULSION POLYMERIZATION

BACKGROUND OF THE INVENTION

This invention is directed to emulsion polymerization, and more particularly to the production of emulsions which are free of positive and negative charges.

The problem to be solved according to this invention is the provision of an emulsion possessing a compatibility with a broader range of additives, for example in the personal care arena. Standard techniques of emulsion polymerization typically utilize an anionic surfactant characterized by a negative charge on the organic part of the molecule or a cationic surfactant which has a positive charge on the organic part. While such techniques have been found to be effective in the production of emulsions, they suffer from the disadvantage of yielding charged emulsions. Because the emulsions bear a charge, their use with many additives bearing an opposite charge is limited.

This problem has been solved according to this invention by the use in the emulsion polymerization technique of only certain nonionic surfactants in combination with initiators for the emulsion polymerization process which are organosilanolates. The emulsions produced in accordance with the present invention have been found to be free of electrical charge from the surfactants, and therefore offer a more ready compatibility with the wide variety of additives currently used in the personal care market.

SUMMARY OF THE INVENTION

The invention relates to a method of making a silicone emulsion. The emulsion is made by dispersing a siloxane in water by forming a mixture of water, a cyclic siloxane, and an ethoxylated alcohol nonionic surfactant. To the mixture is added a polymerization initiator which is an organosilanolate. The mixture is free of other surfactants which bear a charge. The method includes the further steps of heating the mixture of water, cyclic siloxane, ethoxylated alcohol, and organosilanolate, agitating the heated mixture, and allowing the cyclic siloxane to polymerize until an emulsion is formed.

The benefit derived from the invention is the production of an emulsion which is free of electrical charge, thus offering an emulsified silicone product possessing a more ready compatibility with a variety of personal care additive packages.

These and other features, objects, and advantages of the present invention will become more apparent from a consideration of the following detailed description thereof.

DETAILED DESCRIPTION OF THE INVENTION

Emulsions are mixtures of at least two components which are substantially immiscible in each other, and a surfactant which lowers interfacial tension between the two phases. A microscopic view of aqueous emulsions reveals two phases, an oil phase and a water phase. Depending upon the proportion of each component, the emulsion can be characterized as an oil-in-water emulsion or a water-in-oil emulsion. The chief distinction between the two being which component, the oil or water phase, comprises the continuous portion of the emulsion. The noncontinuous phase is in the form of droplets in the other phase.

Methods for making aqueous emulsions of polydiorganosiloxanes are well known in the art and can be separated into two types—mechanical means and emulsion polymerization means. Mechanical means typically involve homogenizing a mixture of polydiorganosiloxane, surfactant, and water using milling machinery to obtain the desired droplet sizes.

Emulsion polymerization methods for making emulsions of high viscosity polymers involve starting with low viscosity polymer precursors, i.e., monomers, or reactive oligomers, which are immiscible in water, a surfactant to stabilize the polymer precursor droplet in water, and a water soluble polymerization catalyst. These components are added to water, the mixture is stirred and polymerization is allowed to advance until the reaction is complete or the desired degree of polymerization is reached and an emulsion of the polymer is formed.

An example of an emulsion polymerization is taught in U.S. Pat. No. 2,891,920 issued Jun. 23, 1959 which shows a method for making aqueous emulsions of a polydimethylsiloxane, starting with precursor molecules of the polydimethylsiloxane.

Polydiorganosiloxane precursors which can be used in the practice of the invention include the cyclic siloxanes which are relatively insoluble in water and which can be polymerized using emulsion polymerization techniques. The preferred cyclic siloxanes are of the general formula:

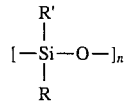

where R and R' denote methyl, ethyl, propyl, vinyl, allyl, or phenyl; n is 3, 4, 5, or 6. The cyclic precursors can be pure species such as octamethylcyclotetrasiloxane, hexamethylcyclotrisiloxane, decamethylcyclopentasiloxane, tetramethyltetravinylcyclotetrasiloxane, tetramethyltetraphenylcyclotetrasiloxane, and the like. Mixtures of the species can also be used. For instance, a mixture of cyclopolydimethylsiloxanes with 3, 4, and 5 siloxane units could be used.

The polymerization medium used in the invention comprises water, an effective amount of surfactant to stabilize the polydiorganosiloxane droplets formed therein, and an effective amount of catalyst to polymerize the polydiorganosiloxane precursor. The preferred amount of catalyst used to catalyze the polymerization of the precursor is between 0.5 to 15 weight percent based on the total weight of the composition depending upon the catalyst employed.

The initiator used as the polymerization catalyst according to the present invention is a silanolate or an organosilanolate. These alkali-metal salts are metal derivatives of organosilanols, and have the formula $R''_xSi(OM)_{4-x}$ in which $R''$ is an alkyl radical having from one to six carbon atoms, an aryl radical; and x has a value of zero to three. Suitable $R''$ radicals are methyl, ethyl, and phenyl. M is an alkali metal in Group IA of the Periodic Table such as lithium, sodium, potassium, rubidium, and cesium. Sodium is the preferred alkali metal. For purposes of the present invention, the value of x is preferably two or three. The most suitable initiators are sodium trimethylsilanolate $NaOSi(CH_3)_3$, sodium triphenylsilanolate $(C_6H_5)_3SiONa$, and disodium dimethylsilanolate $(CH_3)_2Si(ONa)_2$.

The sodium salts of the triorganosilanols can be obtained from the reaction of the corresponding hexaorganodisiloxane and sodium hydroxide in an alcoholic solution. Trimethylsilanolates are obtained by the reaction of hexamethyldisiloxane with sodamide or potassamide in liquid ammonia or absolute ether. Silanolates can also be obtained by the reaction of triorganoalkoxysilanes with alkali-metal hydroxides, or triorganosilanols with alkali metals or alkali-metal hydroxides.

As noted above, the mixture is free of surfactants which bear a charge, and includes as the emulsifier, a nonionic surfactant in the form of an ethoxylated alcohol. Representative nonionic surfactants are ethoxylated fatty alcohols. Such fatty alcohol ethoxylates contain in their molecule the characteristic group $-(OCH_2CH_2)_nOH$ which is attached to a fatty hydrocarbon residue of about eight to twenty carbon atoms such as lauryl ($C_{12}$), cetyl ($C_{16}$) and stearyl ($C_{18}$). The integer "a" in the group can have a value of one to about one hundred, but typically has a value of about 12 to 40.

Examples of commercial products found to be suitable according to the present invention, include the various polyoxyethylene fatty alcohols sold under the tradename BRIJ by ICI Americas Incorporated, of Wilmington, Del.; the tradename EMERY by the Henkel Corporation/Emery Group, of Ambler, Pa.; the trademark ETHOSPERSE® by Lonza Incorporated, of Fairlawn, N.J.; and the trademark PROMULGEN® by the Amerchol Corporation, of Edison, N.J.

A particularly preferred nonionic surfactant is BRIJ 35 Liquid. This polyoxyethylene (23) lauryl ether has an HLB value of about 16.9 and a structure corresponding to the formula $C_{12}H_{25}(OCH_2CH_2)_{23}OH$. Laureth-23 is The Cosmetic, Toiletry, and Fragrance Association (CTFA) adopted name for polyoxyethylene (23) lauryl ether.

Laureth-23 is sold under other names, for example, the trademark AMEROXOL® LE-23 by the Amerchol Corporation, of Edison, N.J.; the tradename EMTHOX 5877 by the Henkel Corporation/Emery Group, of Ambler, Pa.; the trademark MACOL® LA-23 by PPG/Mazer of Gurnee, Ill.; and the trademark WITCONOL® 5964 by the Witco Corporation, of New York, N.Y.

Other polyoxyethylene fatty alcohols which can be employed in accordance with the concepts of the present invention are polyoxyethylene (4) lauryl ether, polyoxyethylene (2) cetyl ether, polyoxyethylene (10) cetyl ether, polyoxyethylene (20) cetyl ether, polyoxyethylene (2) stearyl ether, polyoxyethylene (10) stearyl ether, polyoxyethylene (20) stearyl ether, polyoxyethylene (21) stearyl ether, polyoxyethylene (100) stearyl ether, polyoxyethylene (2) oleyl ether, polyoxyethylene (10) oleyl ether, and polyoxyethylene (20) oleyl ether.

The polymerization mixture which is used according to the invention preferably contains 50 to 80 percent by weight of water, 10 to 50 percent by weight of the cyclic siloxane, 5 to 15 percent by weight of the ethoxylated alcohol nonionic surfactant, and 0.5 to 15 percent by weight of the organosilanolate initiator.

The method of this invention is preferable carried out by creating a mixture comprising a cyclic siloxane, nonionic surfactant, water and catalyst. The mixture is then heated with agitation at a polymerization reaction temperature until essentially all of the cyclic siloxane is reacted and a stable, oil-free emulsion is formed. The time required for formation of the stable, oil-free emulsion will vary depending on the reactants and the reaction conditions.

The mixture of cyclic siloxane, nonionic surfactant, water and catalyst is not stable and will separate without some means of agitation. It is not necessary to have all of the cyclic siloxane fully dispersed into the mixture during the reaction however, some means of agitation must be provided throughout the course of the reaction.

Combining the cyclic siloxane, nonionic surfactant, water and catalyst and then reacting the cyclic siloxanes to form the emulsion can take place in several ways. The first of these ways is to combine all of the ingredients with agitation, in any given order and heat to the desired polymerization temperature with agitation thereby allowing the cyclic siloxanes to react and form an emulsion. Another way is to combine all of the ingredients with agitation, except for the catalyst, heat to the desired polymerization temperature, add the catalyst and thereafter heat and agitate at the desired polymerization temperature thereby allowing the cyclic siloxanes to react and form an emulsion. Another way is to combine all of the ingredients with agitation, except for the cyclic siloxane, heat to the desired polymerization temperature, add or feed in the cyclic siloxane and thereafter heat and agitate at the desired polymerization temperature thereby allowing the cyclic siloxanes to react and form an emulsion.

It is not essential that the ingredients used in producing the emulsions by the method of this invention be combined in any given order. However, it is essential to have agitation during and following the addition of the ingredients and to have achieved or to heat to the polymerization temperature when all of the ingredients have been combined.

The preferred method for forming the emulsions is to create a mixture by combining the cyclic siloxane or mixture of cyclic siloxanes, at least one nonionic surfactant, and water; providing agitation such that the cyclic siloxane is fully dispersed in the mixture; heating to the polymerization temperature; and adding the catalyst. The mixture is then held at the polymerization temperature with agitation until a stable, oil-free emulsion is formed.

The method of this invention may also be carried out by combining and mechanically emulsifying at least the siloxane reactant, nonionic surfactant and part of the water. Additional water, catalyst, and nonionic surfactant can be added to the pre-emulsion with agitation. The mixture is then heated to the polymerization reaction temperature and held optionally with agitation until the monomer is consumed in forming the emulsion.

Polymerization reaction temperatures useful in the method of the instant invention are typically above the freezing point and below the boiling point of water. Pressures above or below atmospheric pressure may allow operation outside of this range. At lower temperatures, especially those below room temperature, the polymerization reaction may proceed more slowly. The preferred temperature range is to have a temperature of at least 50° C. but less than 95° C.

The polymerization reaction can be stopped at the desired level of conversion of cyclic siloxane and particle size by using methods known in the art. It is preferred to stop the reaction when the largest amount of cyclic siloxane has been reacted or when the ring-chain equilibrium for the system and the desired particle size have been obtained. Reaction times of less than 24 hours and typically less than eight hours, are sufficient to achieve the desired particle size and level of conversion. The methods for stopping the reaction typically encompass neutralization of the catalyst by the addition of an equal or slightly greater stoichiometric amount of acid. Either a strong or a weak acid may be used to neutralize the reaction. Care must be taken when using a strong acid not to over neutralize as it may be possible to re-catalyze the reaction. It is preferred to neutralize with sufficient quantities of acid such that the resulting emulsion has a pH of about 7.

In order to illustrate the invention in more detail, experiments were conducted and the details are set forth in the following examples.

EXAMPLE I

The silanolate initiator disodium dimethylsilanolate $(CH_3)_2Si(ONa)_2$ was prepared in a five hundred milliliter three-necked flask by adding eighty grams of sodium hydroxide pellets and 225 grams of distilled water, and heating the contents of the flask to seventy degrees Centigrade. This was followed by the addition to the flask of 120 grams of dimethyldimethoxysilane $(CH_3)_2Si(OCH_3)_2$ accompanied with stirring. Methanol generated during the reaction was removed by distillation.

EXAMPLE II

An emulsion was prepared in a three-necked one liter flask by charging the flask with 225 grams of distilled water, 36.25 grams of BRIJ 35 Liquid nonionic surfactant, and 145 grams of octamethylcyclotetrasiloxane, and the flask was heated to ninety degrees Centigrade. BRIJ 35 Liquid is a polyoxyethylene (23) lauryl ether having an HLB value of about 16.9, and a structure corresponding to the formula $C_{12}H_{25}(OCH_2CH_2)_{23}OH$. Laureth-23 is the CTFA adopted name, and the product is sold as a water solution containing 72 percent of the active ingredient, under the tradename BRIJ by ICI Americas Incorporated, of Wilmington, Del. To the flask was added 7.5 grams of the silanolate initiator disodiumdimethylsilanolate $(CH_3)_2Si(ONa)_2$ prepared in Example I. The mixture in the flask was stirred for 8–13 hours, and 2.7 grams of acetic acid was added, and the mixture was cooled to room temperature. The product was a neutral hazy white emulsion having a mean particle size of low molecular weight siloxane droplets of sixty-five nanometers, as determined by measurement on a NICOMP PARTICLE SIZE ANALYZER. The viscosity of the siloxane polymer was 411 centistokes ($mm^2/s$) after twelve hours.

EXAMPLE III

Example II was repeated except that instead of using BRIJ 35 Liquid as the nonionic surfactant, there was employed 24.1 grams of 100 percent active of MACOL®SA-40, which is another type of nonionic surfactant. This fatty ester has an HLB value of 4.9 and is a polyoxyethylene (40) stearyl ester. The CTFA adopted name for this material is PEG-40 Stearate, and MACOL®SA-40 is a product and trademark of PPG Industries, of Gurnee, Ill. There was also employed 12.1 grams of 100 percent active SPAN 60, which is yet another type of nonionic surfactant. This fatty acid ester has an HLB value of 4.7 and is a sorbitan monostearate. The CTFA adopted name for this material is Sorbitan Stearate, and SPAN 60 is a product and tradename of ICI Americas Incorporated, of Wilmington, Del. It is the monoester of stearic acid and hexitol anhydrides derived from sorbitol. At the end of the reaction, two separate layers were observed in the flask, indicating that an emulsion had not been formed. However, the top layer contained a silicone oil. The results of this example show that the type of nonionic surfactant employed in this example was not effective in forming emulsions according to the present invention. These results indicate that better results can be obtained using ethoxylated fatty alcohols as the nonionic surfactant.

Other variations and modifications may be made in the compounds, compositions, and methods described herein, without departing from the essential features and concepts of the present invention.

The forms of the invention described herein are exemplary only, and are not intended as limitations on the scope of the invention as defined in the appended claims.

That which is claimed is:

1. A method of making a silicone emulsion comprising dispersing a siloxane in water by forming a mixture of water, a cyclic siloxane, and an ethoxylated alcohol nonionic surfactant; adding to the mixture a polymerization initiator which is an organosilanolate; heating the mixture of water, cyclic siloxane, ethoxylated alcohol, and organosilanolate; agitating the heated mixture; and allowing the cyclic siloxane to polymerize until an emulsion is formed.

2. A method according to claim 1 in which the cyclic siloxane has the formula $[—RR'Si—O—]_n$ in which R and R' are selected from the group consisting of an alkyl radical having from one to six carbon atoms, an aryl radical, and an alkenyl radical; and n is an integer having a value of three to six.

3. A method according to claim 1 in which the polymerization initiator is an organosilanolate having the formula $R''_xSi(ONa)_{4-x}$ in which R'' is selected from the group consisting of an alkyl radical having from one to six carbon atoms, and an aryl radical; and x has a value of zero to three.

4. A method according to claim 1 in which the mixture includes 50 to 80 percent by weight of water, 10 to 50 percent by weight of the cyclic siloxane, 5 to 15 percent by weight of the ethoxylated alcohol nonionic surfactant, and 0.5 to 15 percent by weight of the organosilanolate initiator.

5. A method according to claim 4 in which the organosilanolate initiator is a compound selected from the group consisting of sodium trimethylsilanolate $NaOSi(CH_3)_3$, sodium triphenylsilanolate $(C_6H_5)_3SiONa$, and disodium dimethylsilanolate $(CH_3)_2Si(ONa)_2$.

6. A method according to claim 1 in which the ethoxylated alcohol nonionic surfactant is selected from the group consisting of polyoxyethylene (4) lauryl ether, polyoxyethylene (23) lauryl ether, polyoxyethylene (2) cetyl ether, polyoxyethylene (10) cetyl ether, polyoxyethylene (20) cetyl ether, polyoxyethylene (2) stearyl ether, polyoxyethylene (10) stearyl ether, polyoxyethylene (20) stearyl ether, polyoxyethylene (21) stearyl ether, polyoxyethylene (100) stearyl ether, polyoxyethylene (2) oleyl ether, polyoxyethylene (10) oleyl ether, and polyoxyethylene (20) oleyl ether.

7. An emulsion prepared according to the method claimed in claim 1.

8. A method of making a silicone emulsion comprising dispersing a siloxane in water by forming a mixture of water, a cyclic siloxane, and an ethoxylated alcohol nonionic surfactant; adding to the mixture a polymerization initiator which is an organosilanolate; the mixture being free of other surfactants which bear a charge; heating the mixture of water, cyclic siloxane, ethoxylated alcohol, and organosilanolate; agitating the heated mixture; and allowing the cyclic siloxane to polymerize until an emulsion is formed.

9. A method according to claim 8 in which the cyclic siloxane has the formula $[—RR'Si—O—]_n$ in which R and R' are selected from the group consisting of an alkyl radical having from one to six carbon atoms, an aryl radical, and an alkenyl radical; and n is an integer having a value of three to six.

10. A method according to claim 8 in which the polymerization initiator is an organosilanolate having the formula $R''_xSi(ONa)_{4-x}$ in which R'' is selected from the group consisting of an alkyl radical having from one to six carbon atoms, and an aryl radical; and x has a value of zero to three.

11. A method according to claim 8 in which the mixture includes 50 to 80 percent by weight of water, 10 to 50 percent by weight of the cyclic siloxane, 5 to 15 percent by weight of the ethoxylated alcohol nonionic surfactant, and 0.5 to 15 percent by weight of the organosilanolate initiator.

12. A method according to claim 11 in which the organosilanolate initiator is a compound selected from the group consisting of sodium trimethylsilanolate $NaOSi(CH_3)_3$, sodium triphenylsilanolate $(C_6H_5)_3SiONa$, and disodium dimethylsilanolate $(CH_3)_2Si(ONa)_2$.

13. A method according to claim 8 in which the ethoxylated alcohol nonionic surfactant is selected from the group consisting of polyoxyethylene (4) lauryl ether, polyoxyethylene (23) lauryl ether, polyoxyethylene (2) cetyl ether, polyoxyethylene (10) cetyl ether, polyoxyethylene (20) cetyl ether, polyoxyethylene (2) stearyl ether, polyoxyethylene (10) stearyl ether, polyoxyethylene (20) stearyl ether, polyoxyethylene (21) stearyl ether, polyoxyethylene (100) stearyl ether, polyoxyethylene (2) oleyl ether, polyoxyethylene (10) oleyl ether, and polyoxyethylene (20) oleyl ether.

14. An emulsion prepared according to the method claimed in claim 8.

15. A method of making a silicone emulsion comprising forming a mixture of water, a cyclic siloxane, and an ethoxylated alcohol nonionic surfactant; adding to the mixture a polymerization initiator which is a silanolate or an organosilanolate; agitating the heated mixture; and allowing the cyclic siloxane to polymerize until an emulsion is formed.

16. A method according to claim 15 in which the cyclic siloxane has the formula $[-RR'Si-O-]_n$ in which R and R' are selected from the group consisting of an alkyl radical having from one to six carbon atoms, an aryl radical, and an alkenyl radical; and n is an integer having a value of three to six.

17. A method according to claim 15 in which the polymerization initiator is an organosilanolate having the formula $R''_xSi(OM)_{4-x}$ in which R'' is selected from the group consisting of an alkyl radical having from one to six carbon atoms, and an aryl radical; x has a value of zero to three; and M is an alkali metal in Group IA of the Periodic Table.

18. A method according to claim 17 in which the organosilanolate initiator is a compound selected from the group consisting of sodium trimethylsilanolate $NaOSi(CH_3)_3$, sodium triphenylsilanolate $(C_6H_5)_3SiONa$, and disodium dimethylsilanolate $(CH_3)_2Si(ONa)_2$.

19. A method according to claim 15 in which the ethoxylated alcohol nonionic surfactant is selected from the group consisting of polyoxyethylene (4) lauryl ether, polyoxyethylene (23) lauryl ether, polyoxyethylene (2) cetyl ether, polyoxyethylene (10) cetyl ether, polyoxyethylene (20) cetyl ether, polyoxyethylene (2) stearyl ether, polyoxyethylene (10) stearyl ether, polyoxyethylene (20) stearyl ether, polyoxyethylene (21) stearyl ether, polyoxyethylene (100) stearyl ether, polyoxyethylene (2) oleyl ether, polyoxyethylene (10) oleyl ether, and polyoxyethylene (20) oleyl ether.

20. An emulsion prepared according to the method claimed in claim 15.

* * * * *